United States Patent [19]

Graham

[11] Patent Number: 4,524,097
[45] Date of Patent: Jun. 18, 1985

[54] WALLCOVERING IN ROLL FORM

[75] Inventor: Thomas Graham, Clitheroe, England

[73] Assignee: Reed International, PLC, London, England

[21] Appl. No.: 532,097

[22] Filed: Sep. 14, 1983

[30] Foreign Application Priority Data

Sep. 14, 1982 [GB] United Kingdom ................ 8226097
Apr. 22, 1983 [GB] United Kingdom ................ 8311066

[51] Int. Cl.³ .......................... B32B 3/00; B32B 7/00; B32B 23/08
[52] U.S. Cl. ..................................... 428/141; 428/211; 428/311.7; 428/316.6; 428/350; 428/513; 428/906
[58] Field of Search ............... 428/141, 155, 159, 172, 428/211, 311.5, 311.7, 317.1, 317.5, 317.7, 350, 513, 904.4, 906, 910

[56] References Cited

U.S. PATENT DOCUMENTS

| | | | |
|---|---|---|---|
| 3,275,469 | 9/1966 | Streit | 428/350 |
| 4,339,491 | 7/1982 | Lauterbach et al. | 428/317.7 |
| 4,427,731 | 1/1984 | Gibson | 428/159 |
| 4,433,025 | 2/1984 | Pusch et al. | 428/211 |

FOREIGN PATENT DOCUMENTS 140154 2/1980 German Democratic Rep. ................................... 428/513

Primary Examiner—William J. Van Balen
Attorney, Agent, or Firm—William R. Hinds

[57] ABSTRACT

A wallcovering comprising a paper ply (13) and plastics ply (10) laminated together and embossed after lamination has materials of the plies chosen so that inherent expansion of the paper ply when wetted is substantially wholly restrained by high resistance of the plastics ply to stretching without taking the plastics ply beyond its elastic limit so that the wallcovering does not bubble or pucker when the paper ply is wetted. Materials suitable for the plastics ply are foamed polystyrene and orientated polypropylene. A degree of fissuring of the plastics ply during embossing is acceptable and can aid porosity for drying.

10 Claims, 2 Drawing Figures

WALLCOVERING IN ROLL FORM

This invention relates to wallcoverings in roll form.

BACKGROUND OF THE INVENTION

The invention is concerned with the type of wallcoverings comprising two plies which have been laminated together and whilst together, and moist, subjected to an embossing process and then piece-wound into rolls. One such wallcovering is sold extensively under the Trade name "ANAGLYPTA".

Such wallcovering has appeal in that it is not costly, in that the ultimate decorative effect it produces is primarily in the hands of the purchaser, in that it conceals defects in surfaces being covered, and in that the decorative effect can be changed or renewed without replacing the wallcovering. This appeal is so great that it tends to mask certain adverse features of the wallcovering in that difficulty can arise in some loss of emboss when pasted and hung and in obtaining a good embossing pattern match between adjacent strips of pasted wallcovering due to non-uniform stretching. The loss of emboss and stretching varies with the wetting that occurs during pasting, hanging and subsequent decoration with water-based paints or emulsions. Hence, such factors as quantity of paste, wetness of paste, soak time, type and thinning of paint or emulsion materials applied and general handling when wet can all contribute to the loss of emboss and amount of stretch. Whilst these factors can be reasonably judged or accommodated to give a fairly consistent stretch by a professional decorator they can give rise to an amateur appearance when ignored.

FEATURES AND ASPECTS OF THE INVENTION

The object of the invention therefore is to provide a wallcovering of the above-stated type which is very much less responsive to the unwanted variables that arise in use and hence can produce a better on-the-wall or ceiling appearance.

It is a further object of the invention to provide a wallcovering in roll form of the kind referred to which is particularly advantageous for covering ceilings as it is light and easy to handle when compared with known embossed laminate which, when pasted, become heavy and difficult to handle.

It is a yet further object to provide a wallcovering in roll form of the kind referred to which is dry strippable for easy re-decoration and it is to be compared with known embossed laminates having a coating of paint which are extremely difficult to strip and may require special stripping agents.

The present invention provides a wallcovering in roll form comprising two plies which have been laminated together and whilst together, and moist, subjected to an embossing process characterised in that one ply is a paper material and the other ply is a plastics material in which the paper material has a selected wet expansion property and in which the plastics material, also selected has a low water liquid permeability, is flexible, is dimensionally stable in the presence of water and is capable of restraining expansion of the wallcovering when it is wetted without exceeding its elastic limit and has a high resistance to stretching.

Selected plastic materials are foamed polystyrene having a web thickness in the range of 50-500 microns and orientated polypropylene having a web thickness in the range of 10-250 microns.

DESCRIPTION OF THE DRAWINGS

The invention is now described further with reference to the accompanying drawing in which.

DESCRIPTION OF PREFERRED EMBODIMENTS

Figure 1:
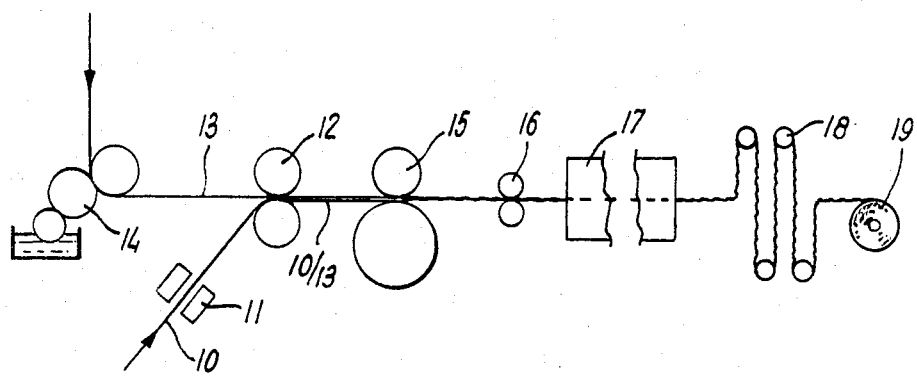
FIG. 1 is a diagram showing the manufacture of a roll-form wallcovering according to the present invention.

In FIG. 1 a foamed polystyrene web 10 having a thickness of 175 microns and a weight of 27 g/m² is fed via a corona discharge pair 11, to surface treat both surfaces of the web, and thence to a laminating nip 12. At the laminating nip the web 10 is brought together with a paper web 13 having a thickness of 125 microns and a weight of 85 g/m². The web 13 passes through a unit 14 where it is coated with 20 g/m² of a tacky water-based adhesive.

From the nip 12 the laminate of web 10 and web 13 passes to an embossing nip 15, a trimmer 16, a drier 17, a compensator 18 and a piece winder 19.

Figure 2:
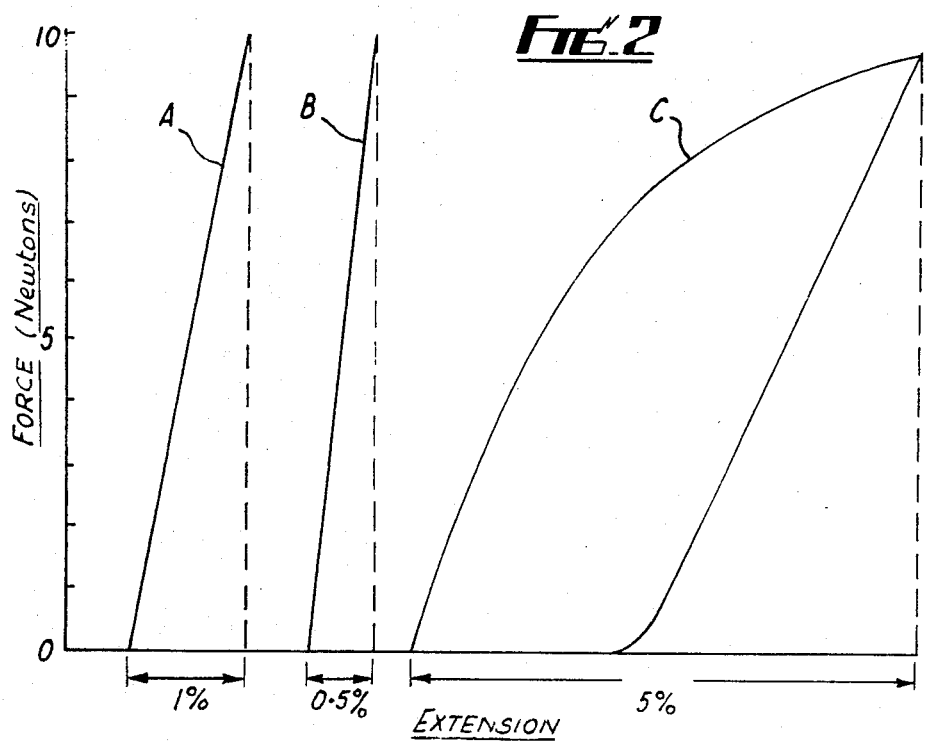
FIG. 2 is a graph showing comparative performance.

In FIG. 2 three materials marked A, B and C are compared for the plastics web. Material A is foamed polystyrene of 175 microns thickness, material B is orientated polypropylene of 25 microns thickness and material C is foamed polyethylene of 60 microns thickness. Materials A and B accord with the invention. Material C does not.

FIG. 2 shows a graph with "Force" in newtons measured vertically and "Extension" as a percentage horizontally for the three materials having a progressive force of 10 newtons applied to a 20 mm wide strip.

Both materials A and B have a high resistance to stretching as observed by their steep gradient and they operate within their elastic limits for all forces which can be practically applied to them as observed by no residual extension as the applied force is reduced.

Material C does not have such a high resistance to stretching and its limit of elastic operation is low (about 2.5 newtons). When taken to a stress of 10 newtons there is a large elongation (5%) of which about 2.5% is residual when the stress is removed.

It has been found that when wallcoverings according to the invention using materials A and B are applied to the wall with the plastics ply adjacent to the wall by prepasting the wall or by pasting the wallcovering, no bubbling or puckering occurs and, in fact, the wallcovering can be decorated with water based covering materials such as "emulsion paints" immediately after hanging. Whilst this moistens the wallcovering again no bubbling or puckering occurs.

Material C does not produce this performance and bubbling and puckering occurs. This is thought to be due to the fact that, when moistened, the paper ply attempts to stretch about 2.5% and the material C is not able to significantly resist this stretching and is stretched beyond its elastic limit. Thus, when the paper dries, a bubble or pucker is created.

With materials A and B the stretching which the paper ply actually executes on the plastics ply is very small (typically about 0.25%) because the plastics ply has a high resistance to stretching and, at the same time, the plastics ply has operated within its elastic limit and restores the very small stretch without bubble or pucker.

The overall stability of the wallcoverings according to the invention is illustrated in a test in which the wall was prepasted and the wallcovering applied to the wall with the paper ply adjacent to the wall. Although such a test would produce totally unacceptable covering using known multi-ply papers, with the wallcovering according to the invention a satisfactory covering was obtained.

When using a paper ply having (on its own) a cross-direction expansion in the range of 1 to 3% when saturated with water the paper ply is restrained to a cross-direction expansion of less than 0.4%, and preferably less than 0.25%, by correct selection of the plastics ply.

Wallcoverings according to the invention can also remain unaffected by humidity changes either in the wall or externally. Wetting by misadventure is also not troublesome. Emboss is retained with hanging and there is no significant stretching regardless of the quantity of pasting, penetration of the pasting, and nature of post-decoration.

The preferred range of thickness of the paper ply is 75–350 microns.

In the course of embossing some degree of fracturing of the plastics ply is acceptable. This can give rise to along-the-web fissures which aids drying by increasing porosity but is insufficient to allow significant wetting of the paper ply by the paste.

Foamed polystyrene, a material not generally encountered in laminate wallcoverings, has many advantages. It has a high resistance to stretching (see Graph A in FIG. 2), it can be used within its elastic limit, and it has a degree of water-vapour porosity which is an aid in drying (300 g/m$^2$/24 hours at 38° C. and 90% humidity).

Laminates of paper and plastics are themselves well known. In this respect reference is made to: GB No. 1,559,279 discloses a wallcovering comprising a sheet of foamed aliphatic thermoplastic polymeric material (expanded polyethylene) and a fibrous web. (GB No. 1,566,273 and GB No. 1,220,053 can be grouped with this.) GB No. 1,397,581 discloses a laminate of a flat sheet and an embossed sheet. GB No. 817,350 discloses a laminate of foamed polystyrene and paper in the context of disposable containers such as cups.

I claim:

1. A wallcovering in roll form for application to a surface with a water-based adhesive and for decoration with a water-based material after application to said surface, said wallcovering comprising two plies (10, 13) which have been laminated together and whilst together, and moist, subjected to an embossing process, characterized in that one ply (13) is a paper material and the other ply (10) is a plastics material, in which the plastics material has a low water liquid permeability, is flexible, is dimensionally stable in the presence of water and is capable of restraining expansion of the wallcovering when it is wetted without exceeding its elastic limit and has a resistance to stretching, the plastics material being foamed polystyrene having a web thickness in the range of 50–500 microns, and in which the resistance to stretching of the wallcovering is such that, with the paper ply material having a cross-direction expansion in the range of 1 to 3% when saturated with water, the wallcovering cross-direction expansion is less than 0.4%.

2. A wallcovering as claimed in claim 1 in which said wallcovering cross-direction expansion is less than 0.25%.

3. A wallcovering in roll form for application to a surface with a water-based adhesive and for decoration with a water-based material after application to said surface, said wallcovering comprising two plies (10, 13) which have been laminated together and whilst together, and moist, subjected to an embossing process, characterized in that one ply (13) is a paper material and the other ply (10) is a plastics material, in which the plastics material has a low water liquid permeability, is flexible, is dimensionally stable in the presence of water and is capable of restraining expansion of the wallcovering when it is wetted without exceeding its elastic limit and has a resistance to stretching, the plastics material being orientated polypropylene having a web thickness in the range of 10–250 microns, and in which the resistance to stretching of the wallcovering is such that, with the paper ply material having a cross-direction expansion in the range of 1 to 3% when saturated with water, the wallcovering cross-direction expansion is less than 0.4%.

4. A wallcovering as claimed in claim 3 in which said wallcovering cross-direction expansion is less than 0.25%.

5. A wallcovering as claimed in claim 3 in which the plastics ply has been taken beyond its rupture point in the course of embossing so that short, spaced, along-the-web, fissures are created to improve porosity for drying.

6. A wallcovering as claimed in claim 3 in which the plastics ply material has a water vapor permeability in the range of 3–600 g/m$^2$/24 hours at 38° C. and 90% relative humidity.

7. A wall having a wallcovering as claimed in claim 3 hung by applying dry to the wall which has been wet-pasted with a water-based adhesive, and, after hanging, the wall-covering is coated with a water-based decorative material.

8. A wall having a wallcovering as claimed in claim 1 hung by applying dry to the wall which has been wet-pasted with a water-based adhesive and, after hanging, the wall covering is coated with a water-based decorative material.

9. A wallcovering as claimed in claim 1 in which the plastics ply has been taken beyond its rupture point in the course of embossing so that short, spaced, along-the-web, fissures are created to improve porosity for drying.

10. A wallcovering as claimed in claim 1 in which the plastics ply material has a water vapour permeability in the range of 3–600 g/m$^2$/24 hours at 38° C. and 90% relative humidity.

* * * * *